US012107282B2

(12) United States Patent
Hwang Bo

(10) Patent No.: US 12,107,282 B2
(45) Date of Patent: Oct. 1, 2024

(54) GASKET FOR CYLINDRICAL BATTERIES CONFIGURED TO PREVENT CORROSION OF BATTERY CASE AND CYLINDRICAL BATTERY INCLUDING THE SAME

(71) Applicant: LG Energy Solution, Ltd., Seoul (KR)

(72) Inventor: Kwang Su Hwang Bo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 120 days.

(21) Appl. No.: 17/609,131

(22) PCT Filed: Apr. 7, 2020

(86) PCT No.: PCT/KR2020/004670
§ 371 (c)(1),
(2) Date: Nov. 5, 2021

(87) PCT Pub. No.: WO2020/226286
PCT Pub. Date: Nov. 12, 2020

(65) Prior Publication Data
US 2022/0223953 A1   Jul. 14, 2022

(30) Foreign Application Priority Data

May 8, 2019   (KR) .................. 10-2019-0053969

(51) Int. Cl.
*H01M 50/186* (2021.01)
*H01M 50/107* (2021.01)
(Continued)

(52) U.S. Cl.
CPC ..... *H01M 50/167* (2021.01); *H01M 50/1245* (2021.01); *H01M 50/145* (2021.01);
(Continued)

(58) Field of Classification Search
CPC ............ H01M 50/167; H01M 50/186; H01M 50/184; H01M 50/152; H01M 50/574; H01M 50/30
See application file for complete search history.

(56) References Cited

U.S. PATENT DOCUMENTS

2002/0032959 A1   3/2002   Malay
2003/0186118 A1   10/2003  Uyama et al.
(Continued)

FOREIGN PATENT DOCUMENTS

CN   109075373 A   12/2018
EP    1818999 A1   8/2007
(Continued)

OTHER PUBLICATIONS

Extended European Search Report including Written Opinion for Application No. 20801553.7 dated May 11, 2022, pp. 1-10.
(Continued)

*Primary Examiner* — Matthew T Martin
*Assistant Examiner* — Jessie Walls-Murray
(74) *Attorney, Agent, or Firm* — Lerner David LLP

(57) ABSTRACT

A gasket for cylindrical batteries includes a supporting portion configured to support a cap assembly and a crimping portion having opposite first and second ends, the crimping portion extending upwards from the first end disposed at a radially outer side of the supporting portion. An extension portion is connected to the second end of the crimping portion and extends along the outer side of the crimping portion towards the first end.

14 Claims, 4 Drawing Sheets

(51) Int. Cl.
*H01M 50/124* (2021.01)
*H01M 50/145* (2021.01)
*H01M 50/147* (2021.01)
*H01M 50/152* (2021.01)
*H01M 50/167* (2021.01)
*H01M 50/184* (2021.01)
*H01M 50/30* (2021.01)
*H01M 50/574* (2021.01)
*H01M 50/198* (2021.01)

(52) U.S. Cl.
CPC ....... *H01M 50/147* (2021.01); *H01M 50/184* (2021.01); *H01M 50/186* (2021.01); *H01M 50/30* (2021.01); *H01M 50/574* (2021.01); *H01M 50/107* (2021.01); *H01M 50/152* (2021.01)

(56) References Cited

U.S. PATENT DOCUMENTS

| | | | |
|---|---|---|---|
| 2006/0093904 A1* | 5/2006 | Cheon | H01M 50/171 429/163 |
| 2007/0015046 A1 | 1/2007 | Kim et al. | |
| 2007/0154781 A1* | 7/2007 | Choi | H01M 50/193 429/174 |
| 2007/0292755 A1 | 12/2007 | Ip | |
| 2008/0131768 A1 | 6/2008 | Lee | |
| 2010/0136388 A1 | 6/2010 | Kim et al. | |
| 2010/0159288 A1 | 6/2010 | Kim | |
| 2010/0216013 A1 | 8/2010 | Kim | |
| 2011/0008654 A1* | 1/2011 | Kim | H01M 50/3425 429/56 |
| 2011/0076527 A1* | 3/2011 | Kim | H01M 50/171 429/53 |
| 2011/0086251 A1* | 4/2011 | Kim | H01M 50/171 429/53 |
| 2011/0104538 A1 | 5/2011 | Yeo | |
| 2011/0129708 A1 | 6/2011 | Doo | |
| 2012/0040239 A1 | 2/2012 | Takahashi et al. | |
| 2013/0273401 A1 | 10/2013 | Lee et al. | |
| 2018/0123163 A1 | 5/2018 | Park et al. | |
| 2018/0159100 A1* | 6/2018 | Lee | H01M 50/152 |
| 2019/0148683 A1 | 5/2019 | Kwon et al. | |
| 2019/0386270 A1 | 12/2019 | Lee et al. | |

FOREIGN PATENT DOCUMENTS

| | | | |
|---|---|---|---|
| EP | 2482358 B1 * | 6/2017 | .............. H01M 2/08 |
| EP | 3432405 A1 | 1/2019 | |
| JP | H07320703 A | 12/1995 | |
| JP | 2002141028 A | 5/2002 | |
| JP | 2003536234 A | 12/2003 | |
| JP | 2005026090 A | 1/2005 | |
| JP | 2007184270 A | 7/2007 | |
| JP | 2012174523 A | 9/2012 | |
| JP | 2014524118 A | 9/2014 | |
| JP | 2017129153 A | 7/2017 | |
| KR | 1997031053 A | 6/1997 | |
| KR | 19980030967 A | 7/1998 | |
| KR | 19980057861 A | 9/1998 | |
| KR | 100601521 B1 | 7/2006 | |
| KR | 20070007537 A | 1/2007 | |
| KR | 20080036249 A | 4/2008 | |
| KR | 20120047114 A | 5/2012 | |
| KR | 20160011983 A | 2/2016 | |
| KR | 20160042327 A | 4/2016 | |
| KR | 20170085978 A | 7/2017 | |
| KR | 20180072990 A | 7/2018 | |
| KR | 20180127938 A | 11/2018 | |
| WO | 2011115392 A2 | 9/2011 | |
| WO | 2018217017 A2 | 11/2018 | |

OTHER PUBLICATIONS

Search Report dated Nov. 23, 2022 from the Office Action for Chinese Application No. 202080027551.0 issued Dec. 1, 2022, 4 pages.

International Search Report for Application No. PCT/KR2020/004670 mailed Jul. 8, 2020, 3 Pages.

* cited by examiner

[FIG. 1]
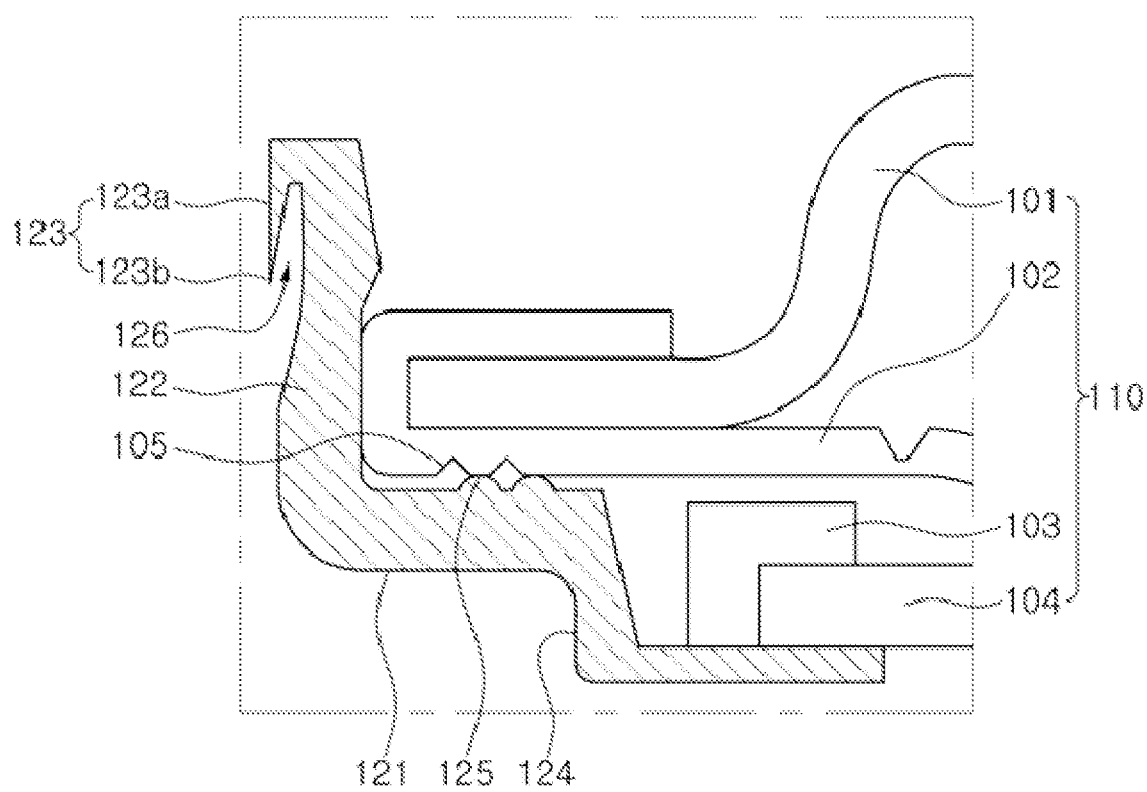

[FIG. 2]
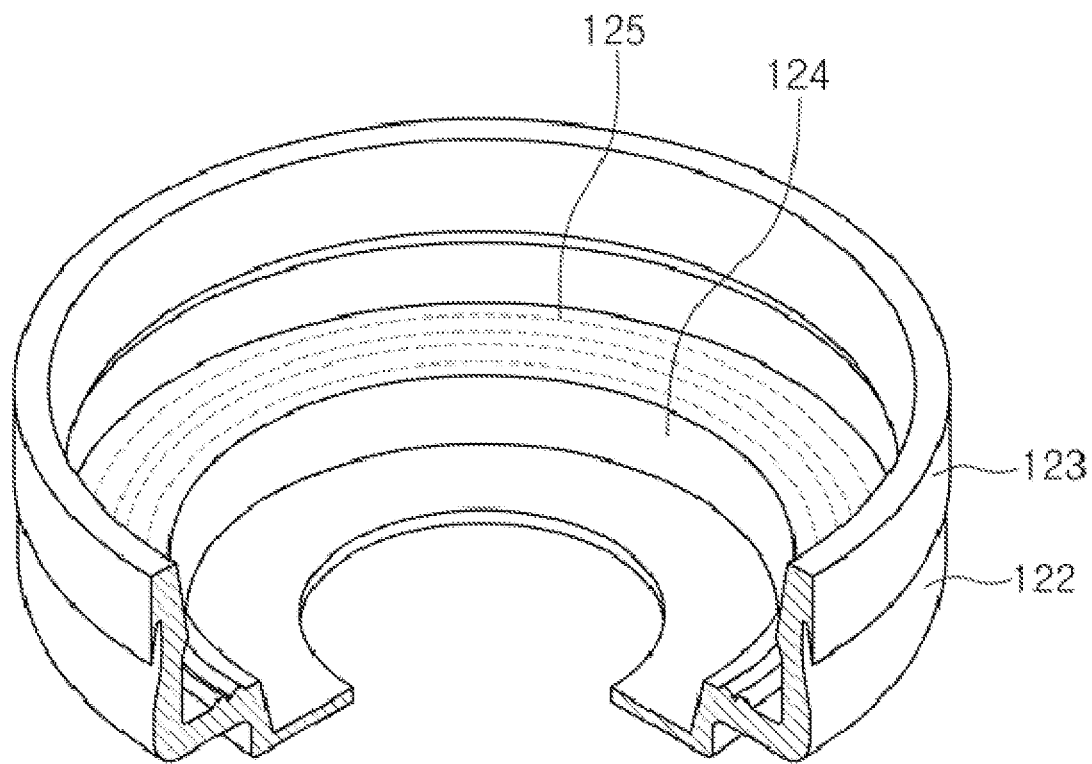

[FIG. 3]
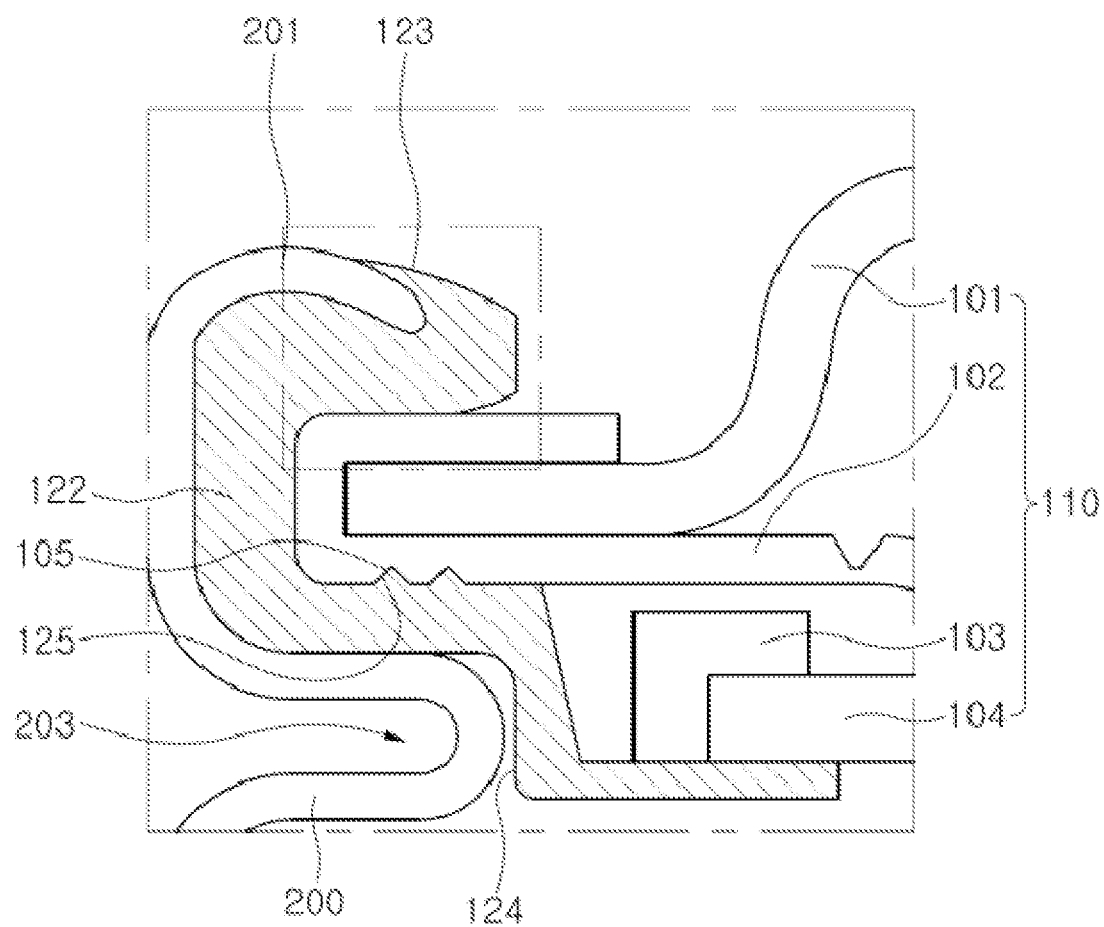

[FIG. 4]
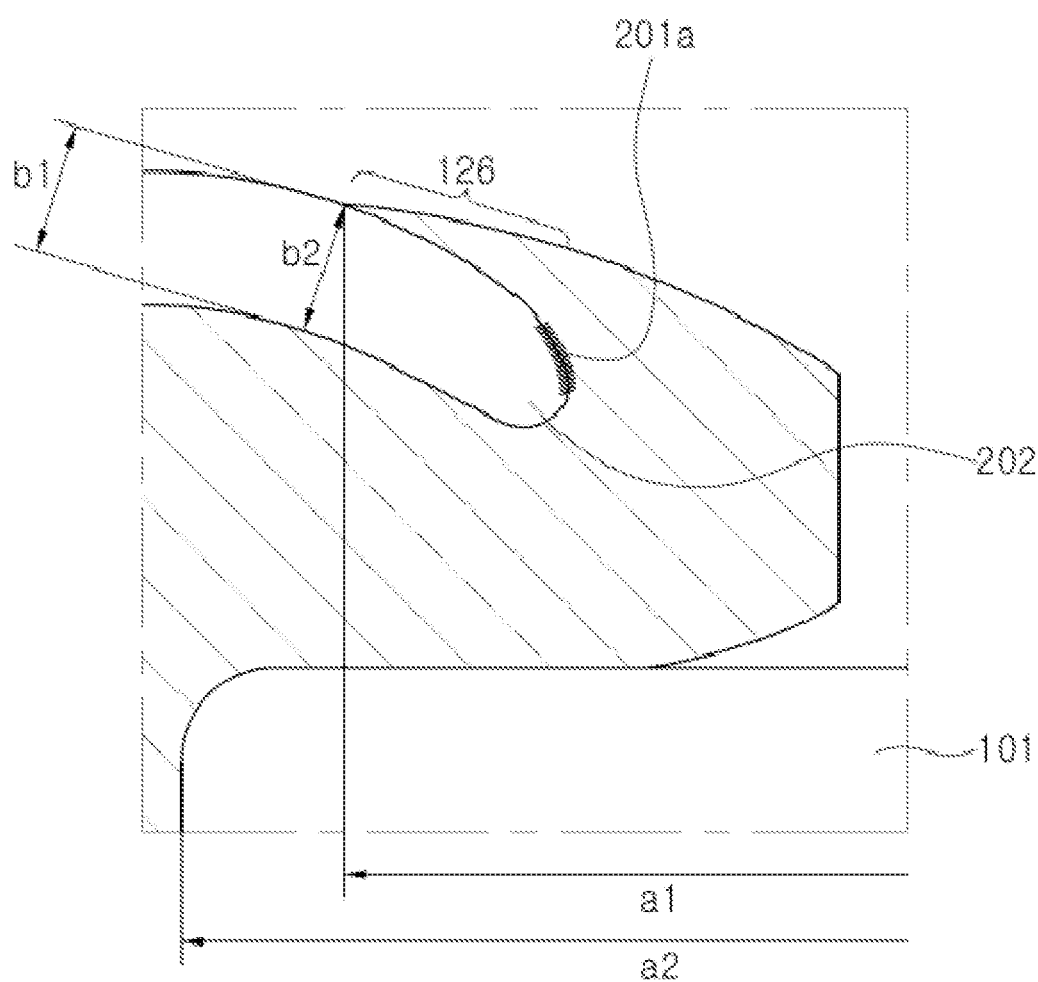

GASKET FOR CYLINDRICAL BATTERIES CONFIGURED TO PREVENT CORROSION OF BATTERY CASE AND CYLINDRICAL BATTERY INCLUDING THE SAME

CROSS-REFERENCE TO RELATED APPLICATIONS

This application is a national phase entry under 35 U.S.C. § 371 of International Application No. PCT/KR2020/004670 filed Apr. 7, 2020, which claims the benefit of priority to Korean Patent Application No. 2019-0053969 filed on May 8, 2019, the disclosure of which is hereby incorporated by reference herein its entirety.

TECHNICAL FIELD

The present invention relates to a gasket for cylindrical batteries configured to prevent corrosion of a battery case and a cylindrical battery including the same, and more particularly to a gasket for cylindrical batteries having a structure configured to wrap the upper part of a cylindrical battery case, from which an anticorrosive layer is removed, in order to prevent corrosion of the battery case and a cylindrical battery including the same.

BACKGROUND ART

There is an increasing trend of mobile devices including mobile phones, earphones and cleaners, most of which are wired products, being manufactured as wireless products. A lithium secondary battery having high energy density, high operating voltage, and excellent lifespan characteristics has been widely used as an energy source that is applied to wireless products.

Depending on the shape of a battery case, the lithium secondary battery is classified as a cylindrical secondary battery, configured such that an electrode assembly is mounted in a cylindrical metal can, a prismatic secondary battery, configured such that an electrode assembly is mounted in a prismatic metal can, or a pouch-shaped secondary battery, configured such that an electrode assembly is mounted in a pouch case made of an aluminum laminate sheet. Thereamong, the cylindrical secondary battery has advantages in that the cylindrical secondary battery has a relatively large capacity and is structurally stable.

In the cylindrical secondary battery, a steel plate made of an iron (Fe) material coated with nickel or the like is used as the battery case in order to prevent corrosion of the battery case, and a process of cutting a cylindrical battery case portion from the steel plate, which is the basic material, is performed after a forming process, such as deep drawing.

At this time, the cut surface of the battery case is a portion at which no nickel coating layer is formed, and therefore the section of the iron material is exposed. The cut surface is still exposed even after a crimping process, whereby the cut surface may rust or corrode.

Korean Patent Application Publication No. 2012-0047114, published on May 11, 2012 ("Patent Document 1") relates to a secondary battery including a battery can configured to receive the electrode assembly without provision of a beading portion and a cap assembly coupled to an open end of the battery can.

In Patent Document 1, a cap cover having a structure configured to wrap the upper part of the edge of the cap assembly and the upper part of the battery can, wherein it is possible to prevent exposure of the battery case using the cap cover, but a structure in which the upper part of the battery case is deformed is used in order to fix the cap cover. In the case in which the upper part of the battery case is deformed, as described above, an additional process is required, and therefore a battery manufacturing process is complicated.

Korean Patent Application Publication No. 2018-0127938, published on Nov. 30, 2018 ("Patent Document 2") relates to a cylindrical battery to which a vaporizable anticorrosive agent including a polymer resin and a sodium nitrate-based material and an anticorrosive gasket including a base resin are applied.

Patent Document 2 discloses a method in which a material in the anticorrosive gasket reacts with moisture to generate a nitrogen oxide, and the nitrogen oxide oxidizes the surface of a cylindrical can, whereby it is possible to prevent corrosion of a crimping portion even under high-temperature, high-humidity conditions.

Korean Patent Application Publication No. 1998-0030967, published on Jul. 25, 1998 ("Patent Document 3") relates to a cylindrical battery including a gasket having a first part including an insertion recess, to which the end of a cylindrical case is fixed by insertion, and a second part extending from the first part to the interior of the case in order to support a cap assembly.

In Patent Document 3, the gasket having the insertion recess, into which the end of the battery case is inserted, is used; however, the gasket is applied to a cylindrical battery having no beading portion and no crimping portion formed thereat, and has a structure in which the distal end of the battery case is inserted into the first part before the crimping portion of the battery case is formed.

Therefore, there is a high necessity for a gasket for cylindrical secondary batteries having a crimping structure, wherein the gasket is configured to have a structure capable of preventing corrosion of a battery case even in the case in which nickel coating is removed from the distal end of the upper part of the battery case, thus forming an exposed portion.

DISCLOSURE

Technical Problem

The present invention has been made in view of the above problems, and it is an object of the present invention to provide a gasket for cylindrical batteries having a structure configured to wrap the distal end of a battery case, from which an anticorrosive coating is easily removed, in order to prevent corrosion of the battery case and a cylindrical battery including the same.

Technical Solution

In order to accomplish the above object, the present invention may provide a gasket for cylindrical batteries configured to have a doughnut shape, the gasket for cylindrical batteries including a supporting portion constituting the lower part of the gasket, the supporting portion being configured to support a cap assembly, and a crimping portion constituting the side part of the gasket, the crimping portion extending upwards from the outside of the supporting portion, wherein an extension portion is formed at the outside of the distal end of the crimping portion so as to extend downwards.

A protrusion structure may be formed at the upper surface of the supporting portion.

The outermost radius of the extension portion may be less than the inner radius of the crimping portion in the state in which the crimping portion is deformed in order to assemble a cylindrical battery.

The gasket for cylindrical batteries may further include a lower end portion formed at the inside of the supporting portion so as to extend downwards.

In addition, the present invention may provide a cylindrical battery including the gasket for cylindrical batteries, wherein the cylindrical battery includes a cylindrical battery case having an electrode assembly received therein, a cap assembly loaded in an open part of the cylindrical battery case, and the gasket for cylindrical batteries interposed between the cylindrical battery case and the cap assembly, and wherein the upper part of the cylindrical battery case wraps the outer circumference of the cap assembly and is bent toward the central part of the cylindrical battery case, and the distal end of the upper part of the cylindrical battery case is received in a reception portion defined by the extension portion of the gasket for cylindrical batteries.

The distance between the crimping portion and the distal end of the extension portion may be equal to or less than the thickness of the upper part of the battery case.

The reception portion may have a structure inclined downwards in the direction toward the center of the battery case in the state in which the cylindrical battery is coupled.

The extension portion may be formed in a shape in which the thickness of the extension portion gradually decreases from the proximal end of the extension portion to the distal end of the extension portion.

A non-coating portion, from which an anticorrosive layer is removed, may be formed on at least a portion of the upper part of the battery case, and the extension portion may have a structure configured to wrap the non-coating portion.

The cap assembly may include a top cap and a safety vent, a concave portion may be formed in the lower surface of the safety vent, and the concave portion may be located so as to engage with the protrusion structure formed at the upper surface of the supporting portion of the gasket for cylindrical batteries, whereby the safety vent and the gasket for cylindrical batteries may be coupled to each other.

The battery case may include a beading portion configured to support the cap assembly and the gasket for cylindrical batteries, and a lower end portion formed at an inside of the supporting portion of the gasket for cylindrical batteries so as to extend downwards may be located between the beading portion and the cap assembly.

The cap assembly may further include a current interrupt device coupled to the lower surface of the safety vent, and the lower end portion of the gasket may include a structure extending in the direction toward the center of the gasket so as to support the current interrupt device.

The present invention may provide a battery pack including the cylindrical battery.

DESCRIPTION OF DRAWINGS

FIG. 1 is an upper sectional view of a cylindrical secondary battery including a gasket according to the present invention before being assembled.

FIG. 2 is a partial cutaway perspective view of the gasket according to the present invention.

FIG. 3 is an upper sectional view of the cylindrical secondary battery including the gasket according to the present invention after being assembled.

FIG. 4 is an enlarged sectional view of an extension portion of the gasket according to the present invention.

BEST MODE

Now, embodiments of the present invention will be described in detail with reference to the accompanying drawings such that the present invention can be easily implemented by a person having ordinary skill in the art to which the present invention pertains. In describing the principle of operation of preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In the present invention, the structure of a gasket, which is a sealing member of a cylindrical battery, is deformed in order to prevent corrosion of a battery case of the cylindrical battery.

In general, a steel plate having a nickel coating layer formed on the surface thereof is used in order to prevent corrosion of a cylindrical battery. The steel plate is deep drawn so as to be formed into the shape of a battery case, and the formed portion is cut from the steel plate in order to be used as a battery case.

At this time, the cut surface of the battery case is a portion at which no nickel coating layer is formed, and the cut surface may rust or corrode when exposed to the air.

Therefore, the present invention solves the above problem by applying a new structure to a gasket used as a sealing member of the cylindrical battery. That is, the structure is changed such that the gasket surrounds the distal end of the upper part of the battery case at which no nickel coating layer is formed.

In connection therewith, FIG. 1 is an upper sectional view of a cylindrical secondary battery including a gasket according to the present invention before being assembled, and FIG. 2 is a partial cutaway perspective view of the gasket according to the present invention.

Referring to FIGS. 1 and 2, a cap assembly 110 includes a top cap 101 having a protruding structure functioning as a positive electrode terminal, a safety vent 102 located at the lower part of the top cap 101 while wrapping the outer circumference of the top cap 101, a current interrupt device 104 disposed so as to contact the lower surface of the safety vent 102, and a CID gasket 103 configured to prevent contact between the current interrupt device 104 and the outer circumference of the safety vent 102.

The gasket, which is used to provide insulation between the cap assembly 110 and a battery case and to seal the battery case, includes a supporting portion 121 configured to support the cap assembly and a crimping portion 122 extending upwards from the outside of the supporting portion 121, and an extension portion 123 is formed at the outside of the distal end of the crimping portion 122 so as to extend downwards.

The gasket further includes a lower end portion 124 formed at the inside of the supporting portion 121 so as to extend downwards, and the lower end portion 124 includes a structure extending more in the direction toward the center thereof so as to support the current interrupt device 104 and the CID gasket 103 configured to provide insulation between the current interrupt device 104 and the safety vent 102.

The safety vent 102 has a concave portion 105 formed in the lower surface thereof, and a protrusion structure 125 is formed at the upper surface of the supporting portion 121. The protrusion structure 125 may be inserted into the concave portion 105, whereby the cap assembly, including the safety vent, may be stably coupled to the gasket, and the cap assembly may be fixed in position via such coupling.

Although the protrusion structure 125 is shown as being a two-line ring-shaped structure, one or more protrusions spaced apart from each other may be continuously or non-continuously formed.

The extension portion 123 defines a reception portion 126 configured to receive the distal end of the battery case, and is formed in a shape in which the thickness of the extension portion 123 gradually decreases from a proximal end 123a of the extension portion to a distal end 123b of the extension portion, whereby the distal end 123b of the extension portion may more tightly contact the battery case in the state in which the battery case is received in the reception portion 126.

FIG. 3 is an upper sectional view of the cylindrical secondary battery including the gasket according to the present invention after being assembled, and FIG. 4 is an enlarged sectional view of the extension portion of the gasket according to the present invention. Referring to FIGS. 3 and 4, the state in which the gasket and the cap assembly 110 of FIGS. 1 and 2 are received in a battery case 200 of the cylindrical battery of FIG. 3 so as to be sealed is shown.

An upper part 201 of the battery case 200 is bent in the direction toward the central part of the battery case through a crimping process and thus is deformed into a structure configured to wrap the upper part of the gasket and the upper surface of the outer circumference of the cap assembly, and a distal end 202 of the upper part 201 of the deformed battery case 200 is received in the reception portion 126 of the gasket defined by the extension portion 123.

The length of the extension portion 123 is not particularly restricted but is a length sufficient to wrap an uncoated portion 201a, from which an anticorrosive layer is removed, formed at the upper part of the battery case. The uncoated portion 201a, from which the anticorrosive layer is removed, is not formed at the distal end but is pushed from the upper part of the battery case toward an outer or inner lower end portion due to deformation of the metal during manufacture of the battery case. Conventionally, design is conducted based on an expectation that corrosion will be prevented due to contact between the distal end portion and the gasket, under the assumption that the uncoated portion is formed at the distal end portion. However, that is without the recognition that it is not possible to prevent continuous corrosion at the uncoated portion that has been pushed from the upper part of the case toward the outer or inner lower end portion.

Particularly, in the case in which a battery is exposed to the outside, it is very important to prevent corrosion of the battery caused by condensation of vapor due to a change in atmospheric temperature, contamination due to rain or snow, and the like. However, corrosion continuously occurs as the result of failure to recognize such a minute difference, and such a problem is still not solved. In contrast, the present invention is capable of solving this problem through recognition of the fact that the uncoated portion is displaced.

In consideration of the fact that the extension portion 123 is located at the outer surface of the upper part of the battery case, however, the extension portion may be formed so as to have a length that does not extend the full height of the crimping portion of the battery case, in order to prevent an increase in total length of the cylindrical battery.

Specifically, referring to FIG. 4, the outermost radius a1 of the extension portion may be formed so as to be less than the inner radius a2 of the crimping portion.

In addition, the thickness of the extension portion decreases in the direction toward the distal end thereof in order to prevent an increase in total length of the cylindrical battery due to addition of the extension portion.

When the gasket and the cap assembly 110 come into tight contact with each other in the state in which the crimping portion 122 and a beading portion 203 are formed, after the cap assembly 110 and the gasket are received in the battery case 200, the protrusion structure 125 of the gasket is inserted into the concave portion 105 of the safety vent, whereby it is possible to provide a structure capable of achieving stable fixing therebetween.

The battery case 200 is formed to have the beading portion 203, wherein the lower end portion 124 of the gasket is located between the beading portion 203 and the cap assembly 110 in order to prevent contact therebetween.

Preferably, the extension portion 123 is located at the outer surface of the battery case 200 so as to be in tight contact with the battery case 200. The distance b1 between the crimping portion 122 and the distal end of the extension portion 123 of the gasket may be equal to the thickness b2 of the upper part of the battery case.

Alternatively, the gasket may be made of an elastic member, wherein the distance b1 between the crimping portion 122 and the distal end of the extension portion 123 may be less than the thickness b2 of the upper part of the battery case. When the upper part of the battery case 200 is inserted into the reception portion 126, the reception portion 126 may be deformed so as to stretch such that the upper part of the battery case is seated therein.

Meanwhile, the reception portion 126 may have a structure inclined downwards in the direction toward the center of the battery case. Even in the case in which force returning the upper part of the battery case to the state before the upper part of the battery case is crimped is applied to the crimped upper part of the battery case due to a rollback phenomenon, therefore, it is possible to minimize exposure of the non-coating portion and, as an additional effect, to stably maintain sealing of the battery case.

In addition, the present invention may provide a battery pack configured such that cylindrical batteries, each of which has the above structure, are connected to each other in series and/or in parallel, and may provide a battery pack having high output, high capacity, and improved safety.

Those skilled in the art to which the present invention pertains will appreciate that various applications and modifications are possible based on the above description, without departing from the scope of the present invention.

DESCRIPTION OF REFERENCE SYMBOLS

101: Top cap
102: Safety vent
103: CID gasket
104: Current interrupt device
105: Concave portion 110: Cap assembly
121: Supporting portion
122: Crimping portion
123: Extension portion
123a: Proximal end of extension portion
123b: Distal end of extension portion
124: Lower end portion
125: Protrusion structure
126: Reception portion
200: Battery case
201: Upper part of battery case
201a: Uncoated portion
202: Distal end of upper part of battery case
203: Beading portion
a1: Outermost radius of extension portion
a2: Inner radius of crimping portion
b1: Distance between crimping portion and distal end of extension portion
b2: Thickness of upper part of battery case

INDUSTRIAL APPLICABILITY

As is apparent from the above description, the present invention has a structure in which a reception portion configured to receive the distal end of the upper part of a battery case is formed in a crimping portion of a gasket, whereby it is possible to prevent corrosion of an exposed iron (Fe) portion, where a nickel (Ni) plating is ruptured, which inevitably occurs at the distal end of the upper part of the battery case during a manufacturing process of the battery case.

In addition, an extension portion of the gasket is formed so as to have a structure inclined downwards in the direction toward the center of the battery case, whereby it is possible to prevent the distal end of the upper part of the battery case from being separated from the reception portion of the gasket due to rollback of the crimping portion.

In addition, the length of the extension portion of the gasket is limited to a predetermined range, whereby it is possible to prevent an increase in total size of a cylindrical secondary battery even in the case in which the extension portion is formed.

The invention claimed is:

1. A doughnut-shaped gasket for cylindrical batteries, comprising:
a lower portion of the gasket defining a supporting portion and a lower end portion, the supporting portion configured to support a safety vent of a cap assembly, and the lower end portion connected to a radially inner side of the supporting portion and extending downwardly therefrom,
wherein the lower end portion of the gasket comprises a lower structure extending radially inwardly so as to support a current interrupt device (CID) having a diameter that is smaller than that of the safety vent;
a radially outer portion of the gasket defining a crimping portion having opposite first and second ends, the crimping portion having a side portion extending upwardly from the first end disposed at a radially outer side of the supporting portion; and
an extension portion having a fixed end connected to the second end of the crimping portion and an opposing free end, the extension portion extending from the fixed end along an outwardly-facing side of the crimping portion towards the first end of the crimping portion,
wherein a thickness of the extension portion gradually decreases from the fixed end to the free end, and
wherein an outermost radius of the extension portion is less than an inner radius of the crimping portion.

2. The gasket according to claim 1, wherein a protrusion is defined on an upper surface of the supporting portion.

3. A cylindrical battery comprising:
a cylindrical battery case including a perimeter wall circumscribing an interior having an electrode assembly received therein, the cylindrical battery case having an open upper end defined by a terminal end of the perimeter wall encircling an opening into the interior;
a cap assembly positioned in the open upper end of the cylindrical battery case; and
the gasket according to claim 1 interposed between the cylindrical battery case and the cap assembly, wherein
an upper portion of the cylindrical battery case wraps around an outer circumference of the cap assembly and is bent inwardly toward a central axis of the cylindrical battery case, and
the terminal end of the perimeter wall of the cylindrical battery case is received in a reception portion defined between the extension portion and the outwardly-facing side of the crimping portion of the gasket.

4. The cylindrical battery according to claim 3, wherein a distance between the outwardly-facing side of the crimping portion and the free end of the extension portion is equal to or less than a thickness of the perimeter wall of the upper portion of the battery case.

5. The cylindrical battery according to claim 3, wherein the reception portion is inclined downwardly as it extends radially inwardly.

6. The cylindrical battery according to claim 3, wherein
the upper portion of the battery case has an uncoated portion lacking an anticorrosive layer, and
the extension portion wraps around so as to cover the uncoated portion.

7. The cylindrical battery according to claim 3, wherein
the cap assembly comprises a top cap,
a protrusion is defined on an upper surface of the supporting portion of the gasket,
a concave portion is formed in a lower surface of the safety vent, and
the concave portion is engaged with the protrusion of the upper surface of the supporting portion of the gasket.

8. The cylindrical battery according to claim 7, wherein
the battery case comprises a beading portion configured to support the cap assembly and the gasket, and
the lower portion of the gasket comprises a lower end portion connected to a radially inner side of the supporting portion of the gasket and extending downwardly therefrom, the lower end portion being located between the beading portion and the cap assembly.

9. The cylindrical battery according to claim 8, wherein the current interrupt device is coupled to a lower surface of the safety vent.

10. A battery pack comprising the cylindrical battery according to claim 3.

11. The cylindrical battery according to claim 3, wherein the free end of the extension portion is located closer to the central axis than a radially inner surface of the side portion of the crimping portion of the gasket.

12. The gasket according to claim 1, wherein the lower structure is configured to support a CID gasket at least partially surrounding the CID so as to prevent contact between the CID and the safety vent.

13. The gasket according to claim 1, wherein the lower end portion of the gasket, including the lower structure, defines a pocket configured to receive the CID therein.

14. The gasket according to claim 13, wherein the pocket is configured to receive a CID gasket at least partially surrounding the CID so as to prevent contact between the CID and the safety vent.

* * * * *